US011308897B2

(12) United States Patent
Shi et al.

(10) Patent No.: US 11,308,897 B2
(45) Date of Patent: Apr. 19, 2022

(54) DISPLAY DEVICE, DISPLAY CONTROL METHOD AND DRIVING DEVICE

(71) Applicants: BOE MLED Technology Co., Ltd., Beijing (CN); BOE Technology Group Co., Ltd., Beijing (CN)

(72) Inventors: Tiankuo Shi, Beijing (CN); Lingyun Shi, Beijing (CN); Xiaomang Zhang, Beijing (CN); Xin Duan, Beijing (CN); Wei Sun, Beijing (CN); Guofeng Hu, Beijing (CN); Zhihua Ji, Beijing (CN); Yanhui Xi, Beijing (CN); Yan Sun, Beijing (CN); Bin Dai, Beijing (CN); Yue Li, Beijing (CN); Yifan Hou, Beijing (CN); Yilang Sun, Beijing (CN); Chuanjun Liu, Beijing (CN); Xue Dong, Beijing (CN)

(73) Assignees: BOE MLED Technology Co., Ltd., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 17/255,989

(22) PCT Filed: May 22, 2020

(86) PCT No.: PCT/CN2020/091770
§ 371 (c)(1),
(2) Date: Dec. 23, 2020

(87) PCT Pub. No.: WO2020/259150
PCT Pub. Date: Dec. 30, 2020

(65) Prior Publication Data

US 2021/0390916 A1 Dec. 16, 2021

(30) Foreign Application Priority Data

Jun. 25, 2019 (CN) ........................ 201910556273.7

(51) Int. Cl.
*G06F 3/038* (2013.01)
*G09G 5/00* (2006.01)
(Continued)

(52) U.S. Cl.
CPC ..... *G09G 3/3426* (2013.01); *G09G 2300/023* (2013.01); *G09G 2320/0233* (2013.01);
(Continued)

(58) Field of Classification Search
CPC ....... G09G 2360/16; G09G 2320/0233; G09G 3/3648
See application file for complete search history.

(56) References Cited

U.S. PATENT DOCUMENTS 7,460,103 B2 12/2008 Konno et al.
8,508,462 B2 8/2013 Yoo et al.
(Continued)

FOREIGN PATENT DOCUMENTS

CN 102971663 A 3/2013
CN 106409237 A 2/2017
(Continued)

OTHER PUBLICATIONS

First Office Action, including Search Report, for Chinese Patent Application No. 201910556273.7, dated Jun. 2, 2020, 18 pages.

*Primary Examiner* — Nan-Ying Yang
(74) *Attorney, Agent, or Firm* — Westman, Champlin & Koehler, P.A.

(57) ABSTRACT

A display device and a display control method, and the display device includes: a backlight module, a first display panel, and a second display panel, and a processor. The processor is configured to: acquire a pixel grayscale matrix of an image to be displayed; determine desired brightness of each pixel by using a grayscale-brightness curve of the second display panel based on the pixel grayscale matrix;
(Continued)

determine set light-emitting brightness of backlight partition according to grayscale information in the pixel grayscale matrix corresponding to the backlight partition; obtain a first corrected brightness of each backlight partition based on light diffusion coefficients of the plurality of backlight partitions; determine a grayscale of pixel unit according to a brightness difference between the first corrected brightness and the desired brightness; obtain a second corrected brightness of the backlight partition.

18 Claims, 7 Drawing Sheets

(51) Int. Cl.
*G09G 5/10* (2006.01)
*G09G 3/34* (2006.01)

(52) U.S. Cl.
CPC ............... *G09G 2320/0242* (2013.01); *G09G 2320/0646* (2013.01); *G09G 2320/0673* (2013.01)

(56) References Cited

U.S. PATENT DOCUMENTS

| | | | | |
|---|---|---|---|---|
| 9,772,530 | B2 | 9/2017 | Gilbert | |
| 9,864,243 | B2 | 1/2018 | Erinjippurath et al. | |
| 10,109,241 | B2 | 10/2018 | Yoo et al. | |
| 2005/0184952 | A1 | 8/2005 | Konno et al. | |
| 2007/0159449 | A1 | 7/2007 | Yoo et al. | |
| 2008/0151139 | A1 | 6/2008 | Lynam | |
| 2011/0279749 | A1 | 11/2011 | Erinjippurath et al. | |
| 2012/0224121 | A1 | 9/2012 | Gilbert | |
| 2016/0042701 | A1* | 2/2016 | Furumoto | G02F 1/1347 345/694 |
| 2017/0032744 | A1 | 2/2017 | Yoo et al. | |
| 2018/0286326 | A1 | 10/2018 | Endo et al. | |
| 2020/0111428 | A1* | 4/2020 | Sohn | G09G 3/3426 |

FOREIGN PATENT DOCUMENTS

| | | | |
|---|---|---|---|
| CN | 107833560 | A | 3/2018 |
| CN | 108681164 | A | 10/2018 |
| CN | 110264964 | A | 9/2019 |
| KR | 100735361 | B1 | 7/2007 |

* cited by examiner

Display device 500

DISPLAY DEVICE, DISPLAY CONTROL METHOD AND DRIVING DEVICE

CROSS-REFERENCE TO RELATED APPLICATIONS

This application is a Section 371 National Stage application of International Application No. PCT/CN2020/091770, filed on May 22, 2020, which has not yet published, and claims priority to Chinese Patent Application No. 201910556273.7, filed on Jun. 25, 2019, the contents of which are incorporated herein by reference in their entireties.

TECHNICAL FIELD

The present disclosure relates to a field of display technology, and in particular to a display device, a display control method, and a driving device.

BACKGROUND

A display device includes a backlight module and a double-cell display panel, and the double-cell display panel may include a sub-panel layer (Sub Cell) and a main panel layer (Main Cell). By adjusting brightness of the sub-panel layer and fine-tuning the main panel layer of the double-cell display panel, a display contrast effect may be improved. However, display brightness of this kind of display device is low, among which peak brightness is low, and there are problems of halation and light leakage.

SUMMARY

The present disclosure provides a display device, a display control method, and a driving device.

According to a first scheme of the present disclosure, a display device is provided, and the display device comprises: a backlight module comprising a plurality of backlight partitions; a first display panel and a second display panel sequentially arranged on a light-emitting side of the backlight module, wherein the second display panel is configured to display images, and the first display panel comprises a plurality of pixel areas corresponding to the plurality of backlight partitions, each pixel area comprises a plurality of pixel units, and each pixel unit corresponds to a plurality of pixels of the second display panel; and a processor configured to: acquire a pixel grayscale matrix of an image to be displayed, wherein a plurality of grayscales of the pixel grayscale matrix correspond to the plurality of pixels of the second display panel one-to-one; determine desired brightness of each of the plurality of pixels by using a grayscale-brightness curve of the second display panel based on the pixel grayscale matrix; determine set light-emitting brightness of each backlight partition according to grayscale information in the pixel grayscale matrix corresponding to each backlight partition; correct the set light-emitting brightness of each backlight partition, based on light diffusion coefficients of the plurality of backlight partitions, to obtain a first corrected brightness of each backlight partition; determine a grayscale of each pixel unit in a corresponding pixel area according to a difference between the first corrected brightness and the desired brightness of each pixel for the corresponding pixel area; correct the set light-emitting brightness of each backlight partition, based on the light diffusion coefficients of the plurality of the backlight partitions and shielding coefficients of the first display panel, to obtain a second corrected brightness of each backlight partition; and for each pixel of the second display panel, adjust a grayscale of each pixel of the image to be displayed according to a difference between the second corrected brightness of a corresponding backlight partition and the desired brightness of the pixel, to cause the second display panel to display the image to be displayed in adjusted grayscale.

For example, the processor is further configured to: reduce a grayscale of each pixel unit in the pixel area in response to the first corrected brightness of the corresponding backlight partition being higher than the desired brightness of the pixels corresponding to the pixel unit.

For example, the processor is further configured to: reduce a grayscale of each pixel in response to the second corrected brightness of the corresponding backlight partition being higher than the desired brightness of the pixel.

For example, the processor is further configured to: determine the set light-emitting brightness of each backlight partition according to a statistical distribution of grayscales of the plurality of pixels corresponding to each backlight partition, or a maximum value of the grayscales of the plurality of pixels, in the pixel grayscale matrix.

For example, the processor is further configured to: for each backlight partition, determine a grayscale of the pixel unit according to a difference between the first corrected brightness and the desired brightness of the pixel for a corresponding pixel unit; smooth and filter the determined grayscale of the pixel unit; correct the set light-emitting brightness of each backlight partition, based on the light diffusion coefficients of the plurality of backlight partitions and the shielding coefficients of the first display panel after smoothing and filtering, to obtain a second corrected brightness; adjust a grayscale of each pixel of the image to be displayed to perform brightness compensation on the image to be displayed, according to a difference between the second corrected brightness of the corresponding backlight partition and the desired brightness of the pixel for the corresponding pixel unit; and perform color correction on the image to be displayed after brightness compensation.

For example, the processor is further configured to: perform uniformly compensation on operating parameters of each backlight partition.

For example, the processor is further configured to: perform uniformity compensation on the smoothed and filtered grayscale of the pixel unit.

According to a second scheme of the present disclosure, a display device is provided, and the display device comprises: a backlight module; a first display panel and a second display panel displaying colors sequentially arranged on a light-emitting side of the backlight module, wherein the second display panel is configured to display images and the second display panel comprises a plurality of pixels, the plurality of pixels correspond to color sub-pixels of an image to be displayed one-to-one, the first display panel comprises a plurality of pixel units, and a height of each of the plurality of pixel units is same as a height of the pixel, a width of each of the plurality of pixel units is twice a width of the pixel, and pixel units in at least part of rows of the first display panel are shifted by one pixel width relative to pixel units in adjacent rows of the first display panel; and a processor configured to: acquire a pixel grayscale matrix of an image to be displayed, wherein elements of the pixel grayscale matrix correspond to the plurality of pixels one-to-one; determine desired brightness of each of the plurality of pixels based on the pixel grayscale matrix; determine a grayscale value of each pixel unit to cause grayscale values of adjacent pixel units corresponding to different color sub-pixels of same pixel of the image to be displayed to be different; correct brightness of each backlight partition based on shielding coefficients of the first display panel after the grayscale is determined, to obtain a third corrected brightness of each backlight partition; and adjust a grayscale of each pixel according to a difference between the third corrected brightness of corresponding backlight partition and the desired brightness of the pixel.

For example, pixel units in even-numbered rows of the first display panel are shifted by one pixel width relative to pixel units in odd-numbered rows of the first display panel.

For example, each group of three pixel units adjacent to each other in a “as” shape in the first display panel correspond to different color sub-pixel combinations, respectively.

For example, the processor is further configured to: smooth and filter the determined grayscale value of the pixel unit; correct brightness of each backlight partition, based on the shielding coefficients of the first display panel after smoothing and filtering, to obtain a third corrected brightness of each backlight partition; adjust a grayscale of each pixel according to a difference between the third corrected brightness of the corresponding backlight partition and the desired brightness of the pixel, to compensate brightness of the image to be displayed; and perform color correction on the image after brightness compensation.

For example, each backlight partition comprises a direct-type micro light-emitting diode array, and a size of each backlight partition is an integer multiple of a size of the pixel unit; and wherein the processor is further configured to: determine set light-emitting brightness of each micro light-emitting diode in each backlight partition according to grayscale information in the pixel grayscale matrix corresponding to each backlight partition; correct the set light-emitting brightness of each micro light-emitting diode in each backlight partition, based on light diffusion coefficients of micro light-emitting diodes in all backlight partitions, to obtain a first corrected brightness of all backlight partitions; and for each backlight partition, determine a grayscale of each pixel unit in the pixel area according to a brightness difference between the first corrected brightness and the desired brightness of the pixel for the corresponding pixel area.

According to a third scheme of the present disclosure, a display control method implemented by a display device is provided, and the display device comprises a backlight module, a first display panel and a second display panel sequentially arranged on a light-emitting side of the backlight module, and the backlight module comprises a plurality of backlight partitions, the plurality of backlight partitions correspond to a plurality of pixel areas of the first display panel, respectively, each pixel area comprises a plurality of pixel units, each pixel unit corresponds to a plurality of pixels of the second display panel, and the second display panel is configured to display images; and wherein the display control method comprises: acquiring a pixel grayscale matrix of an image to be displayed, wherein elements of the pixel grayscale matrix correspond to the plurality of pixels one-to-one; determining desired brightness of each of the plurality of pixels based on the pixel grayscale matrix; determining set light-emitting brightness of each backlight partition according to grayscale information in the pixel grayscale matrix corresponding to each backlight partition; correcting the set light-emitting brightness of each backlight partition, based on light diffusion coefficients of the plurality of backlight partitions, to obtain a first corrected brightness of each backlight partition; determining a grayscale of each pixel unit in the pixel area according to a difference between the first corrected brightness and the desired brightness of a pixel for corresponding pixel area; correcting the set brightness of each backlight partition, based on light diffusion coefficients of the plurality of backlight partitions and shielding coefficients of the first display panel, to obtain a second corrected brightness of each backlight partition, wherein the shielding coefficients of the first display panel are determined by using a grayscale of each pixel unit; and adjusting a grayscale of each pixel of the second display panel according to a brightness difference between the second corrected brightness of a corresponding backlight partition and the desired brightness of each pixel of the second display panel.

According to a fourth scheme of the present disclosure, a display control method implemented by a display device is provided, and the display device comprises a backlight module, a first display panel and a second display panel sequentially arranged on a light-emitting side of the backlight module, and the second display panel is configured to display images and the second display panel comprises a plurality of pixels, the plurality of pixels correspond to color sub-pixels of an image to be displayed one-to-one, the first display panel comprises a plurality of pixel units, and a height of each of the plurality of pixel units is same as a height of the pixel, a width of each of the plurality of pixel units is twice a width of the pixel, and pixel units in at least part of rows of the first display panel are shifted by one pixel width relative to pixel units in adjacent rows of the first display panel; and wherein the display control method comprises: acquiring a pixel grayscale matrix of an image to be displayed, wherein elements of the pixel grayscale matrix correspond to the plurality of pixels one-to-one; determining desired brightness of each pixel unit based on the pixel grayscale matrix; determining a grayscale value of each pixel unit to cause grayscale values of adjacent pixel units corresponding to different color sub-pixels of same pixel of the image to be displayed to be different; correcting brightness of the backlight partition, based on shielding coefficients of the first display panel after the grayscale is determined, to obtain a third corrected brightness of each backlight partition; and adjusting a grayscale of each pixel according to a difference between the third corrected brightness of corresponding backlight partition and the desired brightness of the pixel.

According to a fifth scheme of the present disclosure, a driving device is provided, and the driving device comprises: a memory configured to store instructions; at least one processor; wherein the at least one processor executes instructions stored in the memory to implement the method according to embodiments of the present disclosure.

According to a sixth scheme of the present disclosure, a non-transitory computer-readable storage medium is provided, and the non-transitory computer-readable storage medium storing instructions is configured to implement the method according to embodiments of the present disclosure when executed by at least one processor.

BRIEF DESCRIPTION OF THE DRAWINGS

In order to explain the technical solutions of the embodiments of the present disclosure more clearly, the drawings of the embodiments will be briefly introduced below. Obviously, the drawings in the following description only relate to some embodiments of the present disclosure, rather than limit the present disclosure.

DETAILED DESCRIPTION OF EMBODIMENTS

In order to make objectives, technical solutions, and advantages of the embodiments of the present disclosure clearer, the technical solutions of the embodiments of the present disclosure will be described clearly and completely in conjunction with the accompanying drawings of the embodiments of the present disclosure. Obviously, the described embodiments are part of the embodiments of the present disclosure, rather than all of the embodiments. Based on the described embodiments of the present disclosure, all other embodiments obtained by those of ordinary skill in the art without creative labor are within the protection scope of the present disclosure. In the present disclosure, a technical term "grayscale" means a grayscale level, for example, a grayscale value within a range of grayscale value 0 to 255.

Unless otherwise defined, the technical terms or scientific terms used in the present disclosure shall have the usual meanings understood by those with ordinary skills in the field to which this disclosure belongs. "Comprise" or "include" and other similar words mean that the elements or objects appearing in front of the word cover the elements or objects listed after the word and their equivalents, without excluding other elements or objects. Similar words such as "connected" or "coupled" are not limited to physical or mechanical connections, but may include electrical connections, whether direct or indirect. "Up", "down", "left", "right", etc. are only used to indicate a relative position relationship. When an absolute position of the described object changes, the relative position relationship may also change accordingly.

In order to keep a following description of the embodiments of the present disclosure clear and concise, the present disclosure omits detailed descriptions of known functions and known components.

Figure 1:
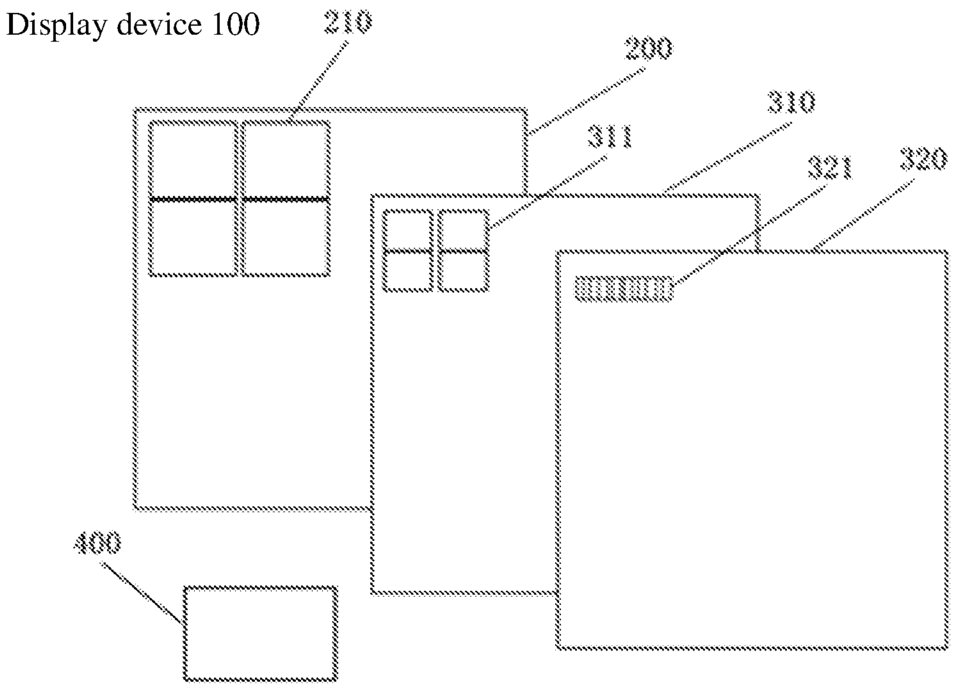
FIG. 1 is a schematic structural diagram of a display device according to an embodiment of the present disclosure.

FIG. 1 is a schematic structural diagram of a display device 100 according to an embodiment of the present disclosure. As shown in FIG. 1, the present disclosure provides a display device 100 including a backlight module 200, and the backlight module 200 includes a plurality of backlight partitions 210. For example, each backlight partition 210 may include a direct-type Mini-LED array. The display device 100 further includes a first display panel 310 and a second display panel 320 sequentially arranged on a light-emitting side of the backlight module 200. The second display panel 320 is configured to display images. The first display panel 310 includes pixel areas each corresponding to each backlight partition, respectively, and a pixel area includes a plurality of pixel units 311. Each pixel unit 311 of the first display panel 310 corresponds to a plurality of pixels of the second display panel 320. The display device 200 further includes a processor 400.

In some embodiments, the processor 400 may be implemented using a system on a chip (SOC), an ASIC (application specific integrated circuit), a microprocessor, or the like. Elements described below as functional blocks that perform various processes may be constituted by circuit blocks, memories, and other large-scale integrated circuits (LSIs) in terms of hardware, and are realized by programs loaded in memories and the like. Therefore, those skilled in the art should understand that the functional blocks may be implemented in various forms by hardware alone, by software alone, or by a combination of hardware and software, and are not limited to one of these forms.

The processor 400 may be configured to acquire a pixel grayscale matrix of an image to be displayed, and elements of the pixel grayscale matrix correspond to the pixels 321 of the second display panel 320 one-to-one; and determine desired brightness of each of the plurality of pixels by using a grayscale-brightness curve of the second display panel 320 based on the pixel grayscale matrix. For example, in a case that the second display panel 320 is provided with a color filter to display a color image, the pixel grayscale matrix may include a grayscale matrix of RGB sub-pixels of all pixels of a color image to be displayed, where each element of the pixel grayscale matrix indicates a grayscale of a color sub-pixel at a position of the color image to be displayed. The pixel grayscale matrix may be transmitted to the display device 100 by a host as a data source. After following various processes of the processor 400, Mini-LED control data may be generated and transmitted to a driver of the Mini-LED array, and control data (adjusted grayscale data) of the first display panel 310 and the second display panel 320 is generated and transmitted to the first display panel 310 and the second display panel 320 to achieve respectively fine adjustments to the first display panel 310 and the second display panel 320, so that not only may contrast and peak brightness be enhanced, but also halo and light leakage may be reduced. In some embodiments, the grayscale-brightness curve may be, for example, a Gamma curve, which may indicate a grayscale-brightness correspondence relationship that takes into account design requirements and hardware performances of the second display panel 320, which may be used to convert a grayscale to a desired brightness. In addition, those skilled in the art may understand that a desired brightness distribution graph of the pixels may be used to indicate desired brightness of the plurality of pixels.

The processor 400 may be further configured to: for each backlight partition 210, determine a set light-emitting brightness of the backlight partition 210 according to grayscale information in the pixel grayscale matrix corresponding to the backlight partition 210. For example, each backlight partition 210 may include a Mini-LED array with 10 rows×10 columns, and grayscale statistics of the sub-pixel grayscale matrix corresponding to the backlight partition 210 may be used, for example, more than 95% of grayscales have higher values, to set all Mini-LEDs to have greater brightness, and the set brightness may be achieved by setting a PWM value and/or a current value of the Mini-LED. For another example, it is also possible to take a maximum value of grayscales corresponding to the pixel grayscale matrix in the backlight partition 210, and according to the maximum value, all Mini-LEDs are set to have maximum brightness through a PWM value and/or a current value. In some embodiments, correspondences between the grayscale and the brightness of the Mini-LED or corresponding operating parameters (the PWM value and/or the current value) may be measured in advance or a list may be established for the processor 400 to call.

The processor 400 may be further configured to: correct the set light-emitting brightness of the Mini-LEDs in each backlight partition 210 to obtain a first corrected brightness of each backlight partition 210 based on light diffusion coefficients of the Mini-LEDs in the plurality of backlight partitions 210. For each backlight partition 210, a grayscale of each pixel unit 311 of the pixel area in the first display panel 310 is determined according to a difference between the first corrected brightness and the desired brightness of each pixel for the corresponding pixel area. For example, all light sources of the backlight module 200 are diffused and aliased correspondingly based on their respective light-emitting angles (though ideally it is desired that a light beam of a Mini-LED is linear, but in fact a diffusion exists) and relative positional relationships between each other. The correction is performed based on the light diffusion coefficients of all the backlight partitions 210, and the obtained first corrected brightness takes into account a light diffusion effect, and for example, is more in line with an actual brightness distribution of the light sources of the Mini-LED array. The first corrected brightness of all backlight partitions may constitute a first corrected brightness distribution graph, which may be understood as a two-dimensional matrix with same size as the Mini-LED array, and each element indicates actual brightness at that location. In some embodiments, a light diffusion coefficient of each Mini-LED of multiple Mini-LED arrays may be simulated in advance by multiple optical simulation software, and stored as a list for the processor 400 to call conveniently. The optical simulation software may be OPTISWORKS software, TRACEPRO software, etc., which is not specifically limited here.

For each backlight partition 210 of the backlight module 200, the processor 400 may determine a grayscale of the pixel unit 311 of the first display panel 310 corresponding to the backlight partition 210 according to a brightness difference between the first corrected brightness of the backlight partition and the desired brightness of pixels for corresponding pixel area, so as to compensate for the brightness difference. For example, when the first corrected brightness of a certain backlight partition 210 is lower than the desired brightness of the pixels for the pixel unit 311 corresponding to the backlight partition 210, a grayscale of the pixel unit 311 of the first display panel 310 corresponding to the backlight partition 210 is determined, so as to perform brightness compensation. In some embodiments, for example, when the first corrected brightness is lower than the desired brightness by certain brightness, grayscales of all the pixels 311 in the first display panel 310 corresponding to the backlight partition 210 may be determined, so that the determined grayscales generate brightness difference values through the first display panel 310. Specifically, for example, the Gamma curve of the first display panel 310 may be used as the brightness difference value—determining the grayscale correspondence, and the grayscales of all pixels 311 in the first display panel 310 corresponding to the backlight partition 210 may be determined based on the brightness difference values. In fact, a function of the first display panel 310 is similar to a light valve that controls an opening degree of each backlight partition separately. In some embodiments, the grayscales of all pixels 311 of the first display panel 310 may be set to a predetermined value, for example, may be set to a maximum grayscale value, so that the opening degree is maximized. For each backlight partition 210, when the first corrected brightness of the backlight partition is higher than the desired brightness of the pixels of the corresponding pixel area, reducing the grayscale of the pixel unit 311 of the first display panel 310 corresponding to the backlight partition 210, for example, reducing to a compensated grayscale corresponding to the brightness difference value on a basis of the preset maximum gray scale value.

Figure 2:
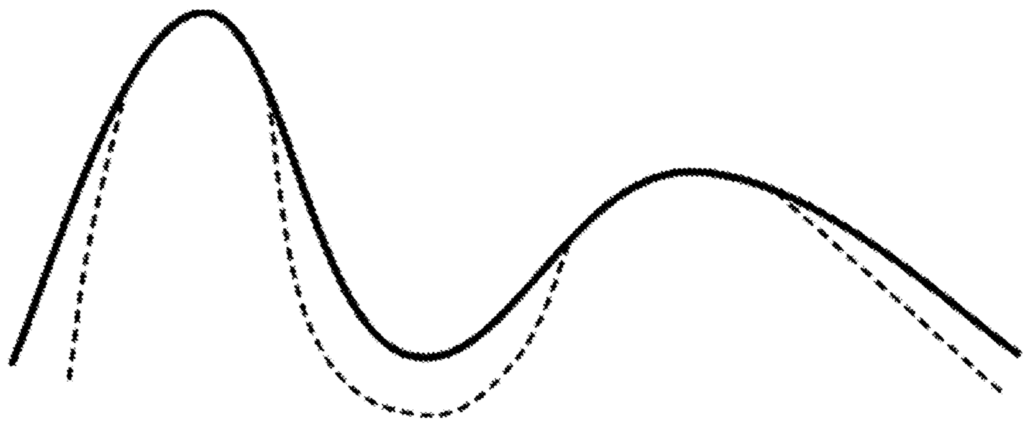
FIG. 2 is a schematic diagram of a light mixing result of a backlight module and a correction effect using a first display panel according to an embodiment of the present disclosure.

A solid line in FIG. 2 schematically shows a light mixing result of the backlight module 200. As shown by the solid line in FIG. 2, a contrast of a displayed image is poor due to light diffusion. By adjusting the grayscale of the pixel unit 311 of the first display panel 310, for example, reducing the grayscale, a display peak brightness of the display device 100 may be improved, while the contrast and sharpness of the image are improved, as shown by a dotted line. Therefore, adverse effects of light mixing are alleviated, and display effect is further corrected.

The processor 400 may be further configured to: based on the light diffusion coefficients of all the backlight partitions 210 and shielding coefficients of the first display panel 310, correct the set light-emitting brightness of each backlight partition 210 to obtain a second corrected brightness of the backlight partition. For each pixel 321 of the second display panel 320, adjusting a grayscale of the pixel 321 according to a brightness difference between the second corrected brightness of the corresponding backlight partition and the desired brightness of the pixel. In this way, the second display panel 320 and the first display panel 310 may be driven respectively according to the adjusted grayscale of each pixel 321 and the determined (or adjusted) grayscale of each pixel unit 311, so as to realize fine control of the second display panel and the first display panel to achieve a desired brightness distribution. Specifically, the first display panel 310 plays a corresponding shielding function based on a grayscale of each pixel unit 311, and may be modeled by optical simulation software to obtain in advance corresponding shielding coefficients of the different grayscales of each pixel 311 of the first display panel 310, and stored as a list for the processor 400 to call conveniently. The optical simulation software may be OPTISWORKS software, TRACEPRO software, etc., which is not specifically limited here. The processor 400 may obtain the shielding coefficient of each pixel unit 311 of the first display panel 310 based on the (adjusted) grayscale determined by each pixel unit 311 of the first display panel 310 by calling a pre-established relationship between grayscale and shielding coefficient. In this way, by comprehensively considering the light diffusion coefficients of all the backlight partitions 210 and the shielding coefficients of the first display panel 310 after the grayscale is determined (adjusted), the second corrected brightness of the backlight partition may be made closer to an actual brightness distribution of the backlight module 200 and the first display panel 310 as a whole. By adjusting the gray scale of the pixel 321 of the second display panel 320, the brightness difference of the pixel 321 between the second corrected brightness of the backlight partition and the desired brightness of the pixel may be compensated, so that for the image to be displayed, actual brightness finally realized by the backlight module 200, the first display panel 310, and the second display panel 320 as a whole is close to the desired brightness, thereby realizing an ideal image display.

In some embodiments, the processor 400 may be configured to: for each pixel 321 of the second display panel 320, when the second corrected brightness of the corresponding backlight partition of the pixel is higher than the desired brightness of the pixel, reducing the grayscale of the pixel 321. For example, the pixel grayscale matrix may be used to drive the second display panel 320. For each pixel 321, when the second corrected brightness of the corresponding backlight partition of the pixel is higher than the desired brightness of the pixel, reducing the grayscale on a basis of the pixel grayscale matrix corresponding to the grayscale of the pixel 321 to perform pixel-level brightness compensation.

With the display device 100 according to an embodiment of the present disclosure, display brightness may be adjusted layer by layer from coarse to fine at levels of the backlight partition 210, the pixels 311 of the first display panel 310, and the pixels 321 of the second display panel 320 (the sub-pixel level of the image). Therefore, compared with adjusting the brightness of the display module 200 and/or the second display panel 320 separately, the efficiency of brightness adjustment is improved, the effect of brightness adjustment is improved, the contrast and peak brightness of the image are enhanced, and the adverse effects of halo are reduced.

Figure 3:
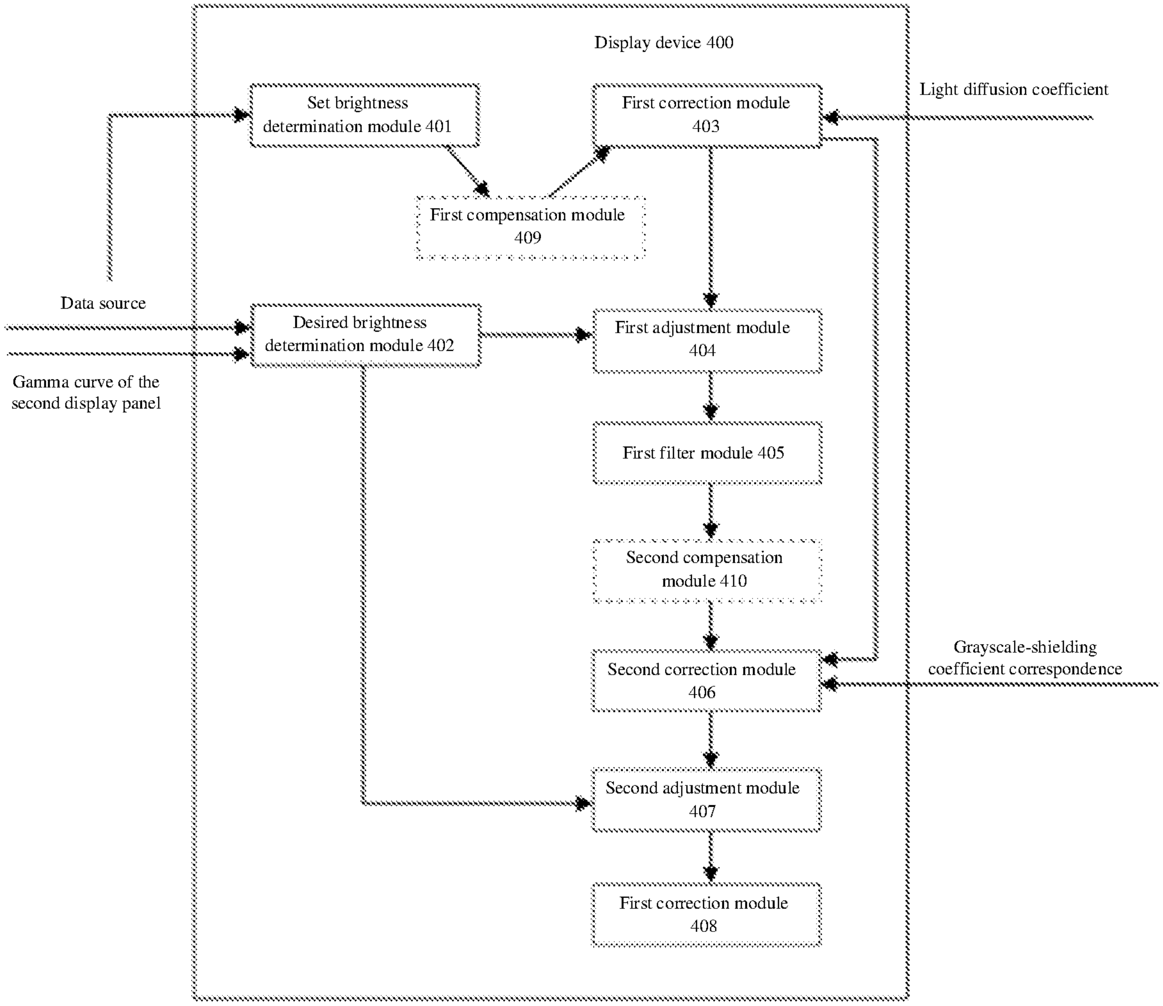
FIG. 3 is a schematic structural diagram of a specific embodiment of a display device according to the present disclosure.

FIG. 3 is a schematic structural diagram of a specific embodiment of a display device 400 according to the present disclosure. As shown in FIG. 3, the display device 400 may include a set brightness determination module 401, a desired brightness determination module 402, a first correction module 403, a first adjustment module 404, a first filter module 405, a second correction module 406, and a second adjustment module 407, and a first correction module 408. The functions performed by each module may be understood in conjunction with the corresponding steps implemented by the processor 400 above, and details are not described herein.

The set brightness determination module 401 may be configured to: for each backlight partition, determine the set light-emitting brightness and/or corresponding operating parameter according to the grayscale information in the pixel grayscale matrix corresponding to the backlight partition from data source. The grayscale information may include: a statistical distribution of the grayscale in the backlight partition, or a maximum value of the grayscale in the backlight partition.

The desired brightness determination module 402 may be configured to determine desired brightness of each of the plurality of pixels by using a grayscale-brightness curve of the second display panel based on the pixel grayscale matrix from the data source.

The first correction module 403 may be configured to: based on the light diffusion coefficients of all backlight partitions, correct the set brightness of each backlight partition determined by the set brightness determination module 401 to obtain the first corrected brightness of all backlight partitions.

The first adjustment module 404 may be configured to: for each backlight partition, determine the grayscale of the corresponding pixel unit of the first display panel according to the brightness difference between the first corrected brightness and the desired brightness of the pixels for the corresponding pixel area.

The first filter module 405 may be configured to smooth and filter the determined grayscale of the pixel unit of the first display panel. For example, the backlight partitions and the pixels of the first display panel may have inaccurate alignment and an alignment deviation may cause block problems. The first filter module 405 is used to smooth and filter the determined grayscale of the pixel unit of the first display panel, so as to increase brightness of a non-smooth part of the display brightness at the periphery of the high-brightness position while ensuring that the brightness at the high-brightness position does not decrease, so that the brightness is smoother. For example, the smoothing and filtering method may include a mean filtering, a median filtering, a Gaussian filtering, etc., which are not specifically limited herein.

The second correction module 406 may be configured to: based on the light diffusion coefficients of all backlight partitions and the shielding coefficients of the first display panel after smoothing and filtering the grayscales, correct the set light-emitting brightness of each backlight partition to obtain a second corrected brightness of the backlight partition. In some embodiments, the second correction module 406 may perform a correction based on the first corrected brightness obtained by the first correction module 403 and further considering the shielding coefficients of the first display panel after smoothing and filtering the grayscale. Specifically, the second correction module 406 may call the grayscale-shielding coefficient correspondence of the first display panel.

The second adjustment module 407 may be configured to: for each pixel of the second display panel, adjust a grayscale of the pixel to perform brightness compensation on the image to be displayed, according to a brightness difference between the second corrected brightness of the corresponding backlight partition and the desired brightness of the pixel. Considering the shielding function of the first display panel on light, the second adjustment module 407 compares the desired brightness with the brightness after the shielding of the first display panel, and determines the grayscales of the pixels of the second display panel according to the comparison result to perform brightness compensation.

The first correction module 408 may be configured to: perform color correction on the brightness-compensated image. In order to prevent the backlight module and the first display panel from affecting the color, the first correction module 408 is used to perform color correction on the brightness-compensated image to ensure the display effect, such as enhancing chroma and saturation of the image, and a sub-pixel grayscale matrix (that is, grayscales of each sub-pixel of RGB) obtained after the chroma and saturation are enhanced is transmitted to the second display panel for display on a main screen.

In the above, the grayscale-brightness curve of the second display panel that needs to be transmitted to the set brightness determination module 401, the light diffusion coefficients of all Mini-LEDs that need to be transmitted to the first correction module 403, and the grayscale-shielding coefficient correspondence that needs to be transmitted to the second correction module 406 may all be obtained through experimental simulation in advance so as to be called by these modules.

In some embodiments, the processor 400 further includes: a first compensation module 409, which is configured to: perform uniformity compensation on the operating parameters corresponding to the set brightness of each backlight partition; and a second compensation module 410, which is configured to: perform uniformity compensation on the smoothed and filtered grayscales of the pixels of the first display panel, as shown by a dashed frame in FIG. 3. Due to limitations of manufacturing processes, the Mini-LED array may have uneven brightness when emitting light. For example, the brightness of the Mini-LED at the peripheral position in the Mini-LED array is lower than that of the Mini-LED at the center. This may affect the display effect of the display device. The first compensation module 409 is used to perform uniformity compensation on the set brightness of each backlight partition, so that the backlight module has good brightness uniformity. For similar reasons, the uniformity compensation may also be performed on the smoothed and filtered grayscales of the pixels of the first display panel, so that the first display panel also has good brightness uniformity.

Figure 4:
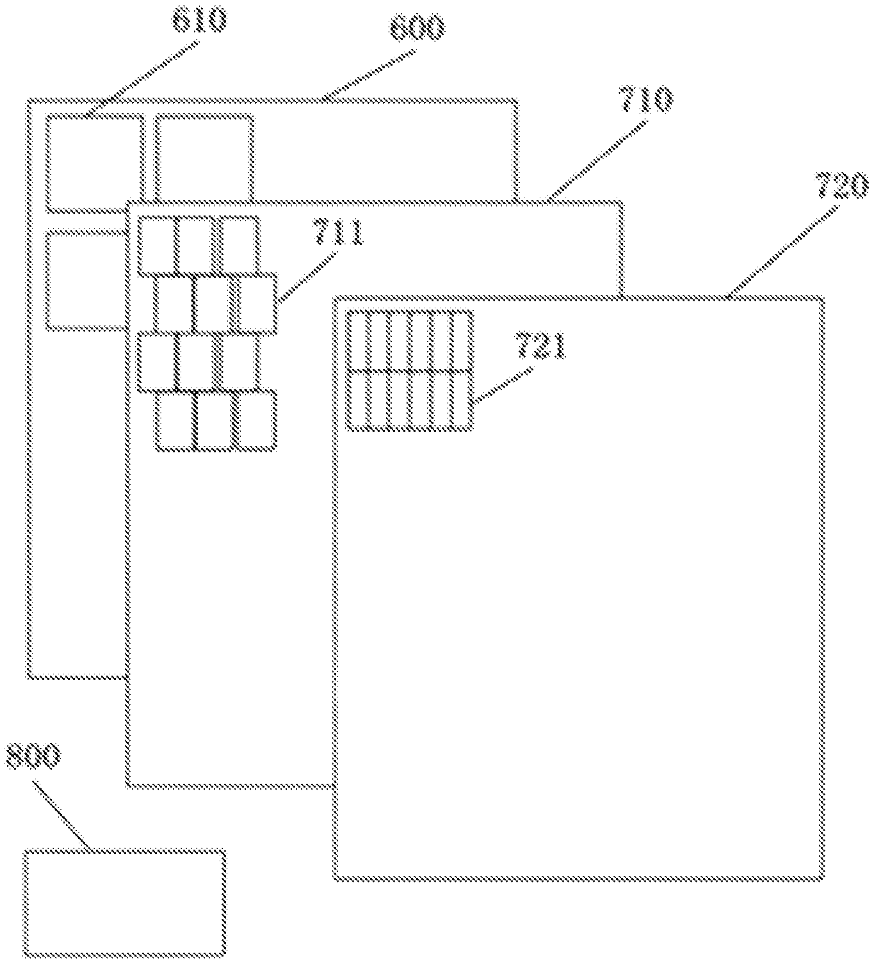
FIG. 4 is a schematic structural diagram of a display device according to an embodiment of the present disclosure.

FIG. 4 is a schematic structural diagram of a display device 500 according to an embodiment of the present disclosure. As shown in FIG. 4, the present disclosure provides a display device 500. The display device 500 includes: a backlight module 600; a first display panel 710 and a second display panel 720 on a light-emitting side of the backlight module 600, where the second display panel 720 is configured to display images and the second display panel includes a plurality of pixels, each pixel corresponds to a color sub-pixel of the image to be displayed one-to-one; and a processor 800. For example, a host transmits a sub-pixel grayscale matrix to the display device 500, and elements of the sub-pixel grayscale matrix correspond to the pixels of the second display panel 720 one-to-one, and are processed by the processor 800 to drive the second display panel 720. A height of a pixel unit 711 of the first display panel 710 is same as a height of a pixel 721 of the second display panel 720, and a width of the pixel unit 711 of the first display panel 710 is twice a width of the pixel 721 of the second display panel 720, and pixel units 711 of at least a part of rows of the first display panel 710 are offset by a width of one pixel (half pixel unit) with respect to pixels of adjacent rows, as shown in FIG. 4, and the pixels 721 of the second display panel 720 are aligned in an usual way. That is, a pixel $PM_k$ in a $k^{th}$ row of the second display panel 720 corresponds to RGB sub-pixels of a pixel $P_{kn}$ in a $k^{th}$ row of an image to be displayed, k may be a natural number from 1 to a number of rows of the image to be displayed, and n may be a natural number from 1 to a number of columns of pixels of the image to be displayed, and indicates a column number of the current pixel of the image to be displayed, that is, the pixel $PM_k$ in the $k^{th}$ row of the second display panel 720 sequentially corresponds to a R sub-pixel, a G sub-pixel, and a B sub-pixel of a pixel $P_{k1}$, a R sub-pixel, a G sub-pixel, and a B sub-pixel of a pixel $P_{k2}$, and a R sub-pixel, a G sub-pixel, a B sub-pixel of a pixel $P_{k3}$, . . . , a R sub-pixel, a G sub-pixel, and a B sub-pixel of a pixel unit $P_{km}$ pixel, where m indicates a number of columns of the image to be displayed. The first display panel 710 may have a pair of adjacent pixel units 711, and the pair of pixel units 711 may correspond to different sub-pixels of the same pixel of the image to be displayed, respectively, such as RG sub-pixels and B sub-pixel, GB sub-pixels and R sub-pixel, BR sub-pixels and G sub-pixel.

The processor 800 may be configured to: acquire a sub-pixel grayscale matrix of the image to be displayed; based on the sub-pixel grayscale matrix, use the grayscale-brightness curve of the second display panel 720 to determine desired brightness of each pixel in the second display panel 720; determine a grayscale value of each pixel unit in the first display panel 710, so that the grayscale values of adjacent pixel units corresponding to different color sub-pixels of the same pixel of the image to be displayed are different. Technical meanings and acquisition methods of “grayscale-brightness curve” and “desired brightness” have been described in detail in the embodiments in conjunction with FIG. 2 and FIG. 3, and may not be repeated here. As the first display panel 710 corresponds to different sub-pixels of the same pixel of the image to be displayed, such as RG sub-pixels and B sub-pixel, the grayscales of the corresponding adjacent pixel units 711 are different, the color of the image may be enhanced.

The processor 800 may also be configured to: based on the shielding coefficient of the first display panel 710 after the grayscale is determined, correct the brightness of the backlight partition to obtain a third corrected brightness of each backlight partition; for each pixel 721 of the second display panel 720, adjust a grayscale of the pixel 721 according to a brightness difference between the third corrected brightness of the corresponding backlight partition and the desired brightness of the pixel. In this way, while enhancing the color of the image, through fine brightness adjustment at the pixel 721 level of the second display panel 720, good brightness compensation may be achieved, so that the compensated brightness distribution is close to the desired brightness distribution. Technical meanings and acquisition methods of “shielding coefficient” and “corrected brightness” have been described in detail in the embodiments in conjunction with FIG. 2 and FIG. 3, and may not be repeated here.

In some embodiments, the backlight module 600 may use a light-emitting diode array having ordinary size, or a direct-type Mini-LED array, so as to further improve the brightness and contrast. A brightness distribution graph of the backlight module 600 may be simulated in advance through optical simulation software. In a case of adopting a direct-type Mini-LED array, for example, the light diffusion coefficients of the Mini-LED may be obtained by simulation, please refer to the description in conjunction with FIG. 2 and FIG. 3, which may not be repeated here. As shown in FIG. 4, the Mini-LED array of the backlight module 600 may be divided into a plurality of rectangular backlight partitions 610, and a length and a width of each backlight partition 610 may be i times and j times (i and j are natural numbers, respectively) as a length and a width of the pixel 711 of the first display panel 710, for example, i may be 3 and j may be 2. In some embodiments, the processor 800 may be further configured to: for each backlight partition 610, determine the set light-emitting brightness according to grayscale information in the sub-pixel grayscale matrix corresponding to the backlight partition 610; based on the light diffusion coefficients of all backlight partitions 610, correct the set brightness of each backlight partition 610 to obtain the first corrected brightness corresponding to all backlight partitions 610; for each backlight partition 610, according to a brightness difference between the first corrected brightness and the desired brightness of the pixel corresponding to the backlight partition, determine the grayscale of the pixel unit 711 in the first display panel 710 corresponding to the backlight partition. In the example of adopting the direct-type Mini-LED array as the backlight module 600, specific manners of determining the set brightness of each Mini-LED in the backlight partition 610, correcting the set brightness, and determining the grayscale of the pixel unit 711 of the first display panel 710 corresponding to the backlight partition 610 have been described in detail in the corresponding description in conjunction with FIG. 2 and FIG. 3, and may not be repeated here. In a case that a certain pixel unit 711 in the first display panel 710 corresponds to two adjacent backlight partitions 610, two grayscales of the pixel unit 711 of the first display panel 710 may be determined based on respective brightness differences of the two adjacent backlight partitions 610. The determined two grayscales are weighted and summed according to an overlap ratio of the pixel unit 711 and the adjacent backlight partitions 610, and the obtained grayscales are used to drive the pixel unit 711.

In some embodiments, as shown in FIG. 4, pixel units 711 located in even rows of the first display panel 710 are shifted by a width of half pixel unit 711 relative to pixel units 711 located in odd rows of the first display panel 710 (for example, shifted to right in a plane shown in FIG. 4). For example, an aspect ratio of the pixel unit 711 of the first display panel 710 may be 2:3, and an aspect ratio of the pixel 721 of the second display panel 720 may be 1:3, so that first pixel units 711 located in the odd rows of the first display panel 710 correspond to first pixels 721 and second pixels 721 in the odd rows of the second display panel 720, and first pixel units 711 located in the even rows of the first display panel 710 correspond to second pixels 721 and third pixels 721 of the second display panel 720, so that by adjusting the first display panel 710, grayscale differences of the pixel units 711 corresponding to different colors may be increased, thereby enhancing color performance ability and improving display effect. For example, each group of three pixel units 711 adjacent to each other in a "品" shape in the first display panel 710 corresponds to different color sub-pixel combinations, for example, a first pixel unit and a second pixel unit in a first row and a first pixel unit in a second row constitute such a "品" shape group, where the first pixel unit in the first row corresponds to RG sub-pixels of a first pixel in a first row of the image to be displayed, and the second pixel unit in the first row corresponds to a B sub-pixel of the first pixel in the first row of the image to be displayed and a R sub-pixel of a second pixel in the first row of the image to be displayed, and the first pixel unit in the second row corresponds to GB sub-pixels of the first pixel in the second row of the image to be displayed. In this way, grayscale difference values may be taken for different color sub-pixel combinations, respectively, so as to avoid an emphasis on certain color sub-pixels, so that various colors may be enhanced evenly.

Figure 5:
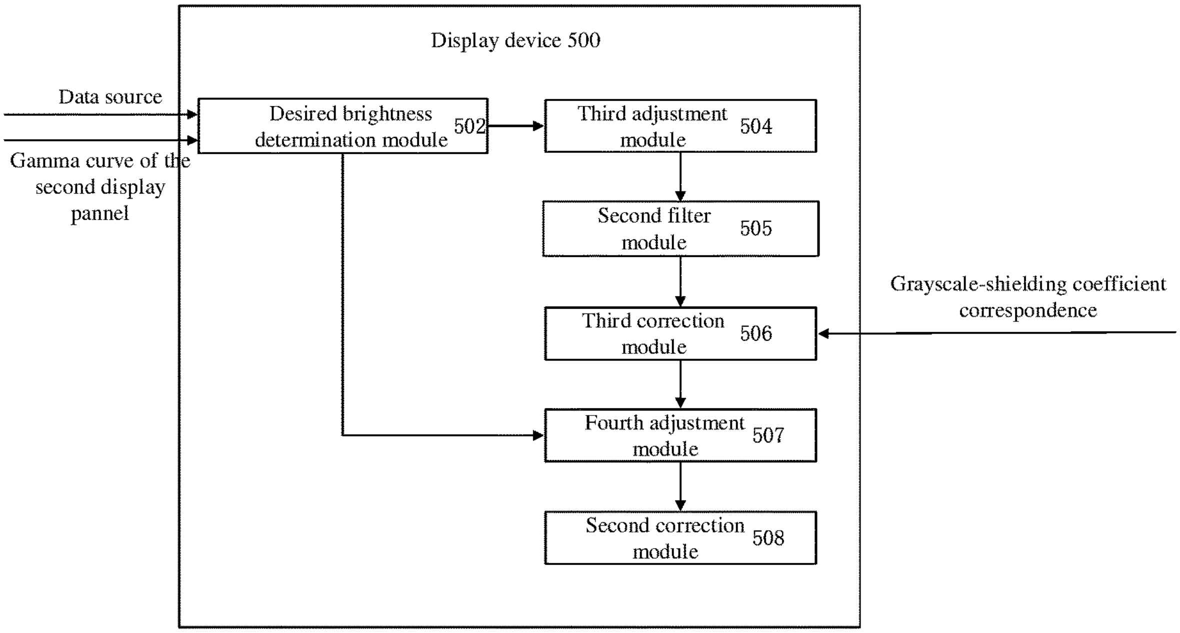
FIG. 5 is a schematic structural diagram of another specific embodiment of a display device according to the present disclosure.

In some embodiments, as shown in FIG. 5, a display device 500 may include a plurality of modules to implement corresponding functions. For example, the display device 500 may include a desired brightness determination module 502, a third adjustment module 504, a second filter module 505, a third correction module 506, a fourth adjustment module 507, and a second correction module 508. The desired brightness determination module 502 is configured to determine desired brightness of each pixel based on the sub-pixel grayscale matrix by using the grayscale-brightness curve of the second display panel. The third adjustment module 504 is configured to determine the grayscales of the pixel units in the first display panel, so that the grayscales of adjacent pixel units corresponding to different sub-pixels of the same pixel of the image to be displayed are different. The second filter module 505 is configured to smooth and filter the determined grayscales of the pixel units of the first display panel. The third correction module 506 is configured to correct the brightness of the backlight partition based on the shielding coefficients of the first display panel after smoothing and filtering the grayscales to obtain a third corrected brightness. The fourth adjustment module 507 is configured to: for each pixel of the second display panel, adjust the grayscale of the pixel according to a brightness difference between the third corrected brightness of the corresponding backlight partition and the desired brightness of the pixel to perform brightness compensation on the image to be displayed. The second correction module 508 may be configured to perform color correction on the brightness-compensated image. Among the above modules, processes performed by the desired brightness determination module 502, the second filter module 505, the third correction module 506, the fourth adjustment module 507, and the second correction module 508 are respectively similar as those performed by the desired brightness determination module 402, the first filter module 405, the second correction module 406, the second adjustment module 407, and the first correction module 408 in FIG. 3, and may not be repeated here.

For example, the third adjustment module 504 may be configured to take different grayscale values of the adjacent pixel units in the first display panel corresponding to different sub-pixels of the same pixel of the image to be displayed, such as RG sub-pixels and B sub-pixel of the same pixel. For example, in a pair of adjacent pixel units of the first display panel, a grayscale of a pixel unit corresponding to a B sub-pixel is 50 to 80 lower than a grayscale of a pixel unit corresponding to RG sub-pixels, so that a contrast of the RG colors and B color is more vivid. In some embodiments, a reference grayscale of each pixel unit may be preset for the first display panel, and a difference value is taken on a basis of the reference grayscale. In some embodiments, the reference grayscale of each pixel unit of the first display panel may be preset according to a difference between the desired brightness and the brightness of the backlight partition, for example, a difference at each pixel unit of the first display panel.

In some embodiments, the second filter module 505 may be configured to smooth and filter grayscales of the pixel units of the first display panel, so as to avoid a deviation of relative positions of the backlight partition and the pixel units of the first display panel and block problems caused by the deviation, so as to increase brightness of a non-smooth part of the display brightness at the periphery of the high-brightness position while ensuring that the brightness at the high-brightness position does not decrease, so that the brightness is smoother. For example, the smoothing and filtering method may include a mean filtering, a median filtering, a Gaussian filtering, etc., which may not specifically limited herein.

In some embodiments, the display device 500 may further include a third compensation module for performing uniformity compensation on the smoothed and filtered grayscales of the pixel units of the first display panel, so that the display brightness has good uniformity.

Figure 6:
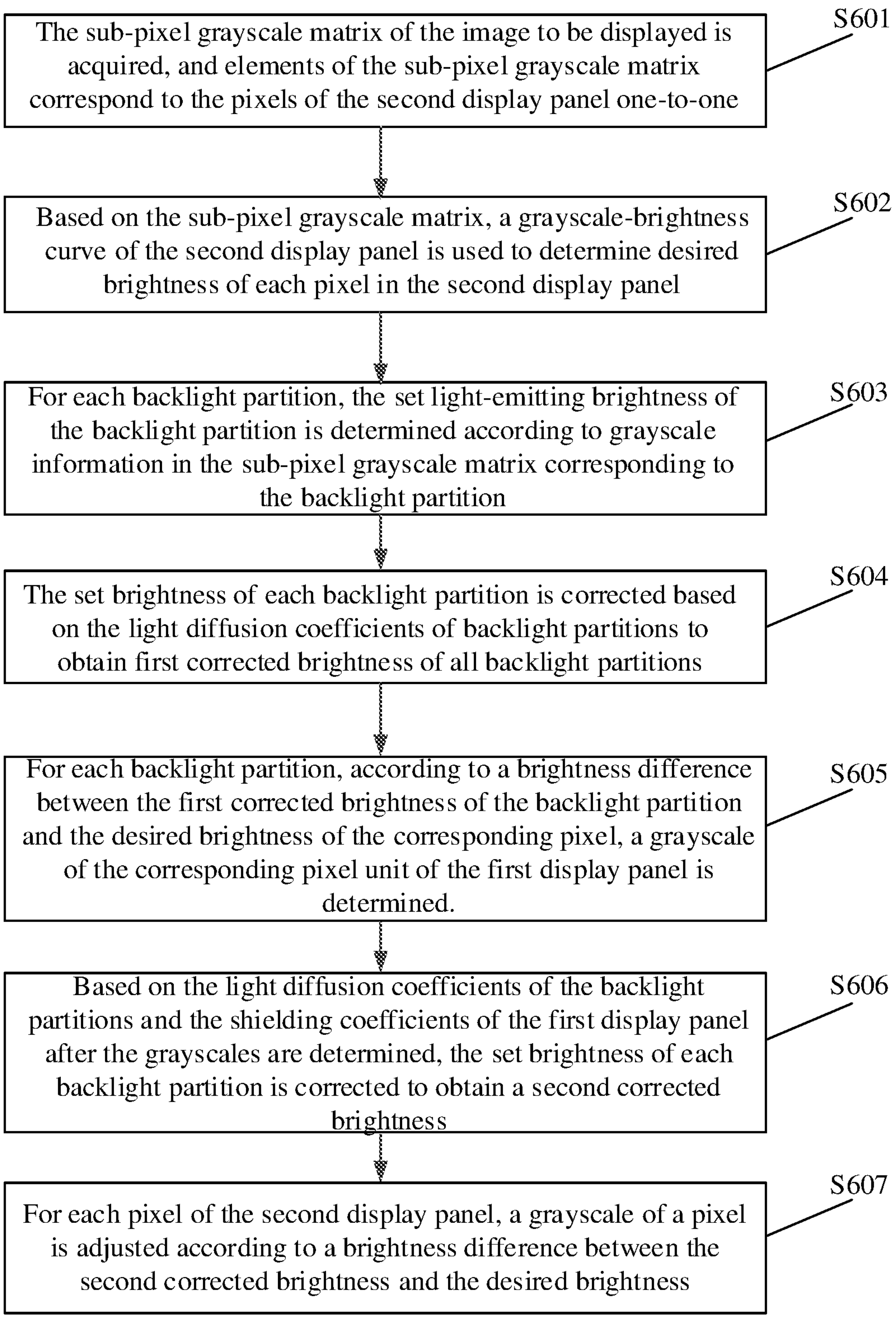
FIG. 6 is a flowchart of a specific embodiment of a display control method according to the present disclosure.

FIG. 6 is a flowchart of a specific embodiment of a display control method according to the present disclosure. As shown in FIG. 6, the present disclosure also provides a display control method, which is applied to a display device, the display device includes a backlight module, a first display panel and a second display panel sequentially arranged on a light-emitting side of the backlight module. For example, the backlight module may include a direct-type micro light-emitting diode array, and the micro light-emitting diode array is divided into a plurality of rectangular backlight partitions, each backlight partition corresponds to a pixel area of the first display panel, and each pixel area includes a plurality of pixel units, each pixel unit of the first display panel corresponds to a plurality of pixels of the second display panel, and the second display panel is configured to display images. The display control method includes following steps S601 to S607.

In step S601, the sub-pixel grayscale matrix of the image to be displayed is acquired, and elements of the sub-pixel grayscale matrix correspond to the pixels of the second display panel one-to-one. For example, in a case that the second display panel is provided with a color filter for displaying a color image, the sub-pixel grayscale matrix may indicate a grayscale matrix of RGB sub-pixels of all pixels of the color image to be displayed, and each element of the sub-pixel grayscale matrix indicates a grayscale of a color sub-pixel at a position of the color image to be displayed. The sub-pixel grayscale matrix may be transmitted to a display device by a host as a data source. After following various processes, Mini-LED control data may be generated and transmitted to a driver of the Mini-LED array, and control data (adjusted grayscale data) of the first display panel and the second display panel may be generated and transmitted to the first display panel and the second display panel to realize fine adjustment of the first display panel and the second display panel, respectively, so that not only may the contrast and peak brightness be enhanced, but also the halo and light leakage may be reduced.

In step S602, based on the sub-pixel grayscale matrix, a grayscale-brightness curve of the second display panel is used to determine desired brightness of each pixel in the second display panel. In some embodiments, the grayscale-brightness curve, such as the Gamma curve, may indicate the grayscale-brightness correspondence that takes into account the design requirements of the second display panel and the hardware performances, which may be used to convert a grayscale to a desired brightness.

In step S603, for each backlight partition, the set light-emitting brightness of the backlight partition is determined according to grayscale information in the sub-pixel grayscale matrix corresponding to the backlight partition. For example, according to grayscale statistics of the sub-pixel grayscale matrix corresponding to the backlight partition, for example, more than 95% of the grayscales have higher values, all Mini-LEDs may be set to have greater brightness, and the set brightness may be achieved by setting a PWM value and/or a current value of the Mini-LED. For another example, it is also possible to take a maximum value of grayscales in the sub-pixel grayscale matrix corresponding to the backlight partition, and according to the maximum value, all Mini-LEDs are set to have maximum brightness by setting a PWM value and/or a current value. In some embodiments, the correspondences between the grayscale and the brightness of the Mini-LED or the corresponding operating parameters (the PWM value and/or the current value) may be measured in advance or a list may be established for calling.

In step S604, the set brightness of the micro light-emitting diodes in each backlight partition is corrected based on the light diffusion coefficients of all backlight partitions to obtain first corrected brightness corresponding to all backlight partitions. For example, all Mini-LEDs in the backlight partition, based on their respective light-emitting angles (though ideally it is desired that a light beam of a Mini-LED is linear, but in fact a diffusion exists) and the relative positional relationship between each other. Based on the light diffusion coefficients of the Mini-LEDs in all backlight partitions, the obtained first corrected brightness takes a light diffusion function into account, which is more in line with an actual brightness distribution of the Mini-LED array. The first corrected brightness may be in a form of the first corrected brightness distribution graph, which may be understood as a two-dimensional matrix with same size as the backlight partition, and each element indicates an actual brightness at that position. In some embodiments, a light diffusion coefficient of each Mini-LED of multiple Mini-LED arrays may be simulated in advance by multiple optical simulation software, and stored as a list for calling conveniently. The optical simulation software may be OPTISWORKS software, TRACEPRO software, etc., which is not specifically limited here.

In step S605, for each backlight partition, according to a brightness difference between the first corrected brightness of the backlight partition and the desired brightness of the corresponding pixel, a grayscale of the corresponding pixel unit is determined to compensate for the brightness difference. For example, for a certain backlight partition, if the first corrected brightness is lower than the desired brightness of the corresponding pixel, determining the grayscales of all pixel units in the first display panel corresponding to the backlight partition to perform brightness compensation. In some embodiments, for example, when the first corrected brightness is lower than the desired brightness by certain brightness, the grayscales of all the pixel units in the first display panel corresponding to the backlight partition may be determined. For example, the Gamma curve of the first display panel may be used as the brightness difference value—determining the grayscale correspondence, and the grayscales of all pixel units in the first display panel corresponding to the backlight partitions may be determined based on the brightness difference values. In fact, a function of the first display panel is similar to a light valve that controls an opening degree of each backlight partition separately. In some embodiments, the grayscales of all pixel units of the first display panel may be set to a predetermined value, for example, may be set to a maximum grayscale value, so that the opening degree is maximized. For each backlight partition, when the first corrected brightness is higher than the desired brightness of the corresponding pixel, reducing the grayscale of the pixel unit in the first display panel corresponding to the backlight partition, for example, reducing to a compensated grayscale corresponding to the brightness difference value on a basis of the preset maximum gray scale value.

In step S606, based on the light diffusion coefficients of all backlight partitions and the shielding coefficients of the first display panel after the grayscales are determined, the set brightness of the micro light-emitting diodes in each backlight partition is corrected to obtain a second corrected brightness. For example, the first display panel plays a corresponding shielding function based on the grayscales of each pixel unit of the first display panel, and the corresponding shielding coefficients for different grayscales of each pixel unit of the first display panel may be obtained in advance through simulation modeling and stored as a list for calling conveniently. The optical simulation software may be OPTISWORKS software, TRACEPRO software, etc., which is not specifically limited here. By calling a pre-established relationship between grayscale and shielding coefficient, based on the determined (adjusted) grayscale of each pixel unit of the first display panel, the shielding coefficient of each pixel unit may be easily obtained. In this way, by comprehensively considering the light diffusion coefficients of all backlight partitions and the shielding coefficients of the first display panel after the grayscale is determined (adjusted), the second corrected brightness of the backlight partition may be made closer to actual brightness of the backlight module and the first display panel as a whole.

In step S607, for each pixel of the second display panel, a grayscale of a pixel of the second display panel is adjusted according to a brightness difference between the second corrected brightness distribution graph and the desired brightness distribution graph at the pixel. By adjusting the grayscales of the pixels of the second display panel, it is possible to compensate for the brightness difference between the second corrected brightness of the backlight partition and the desired brightness of the pixel, so that actual display brightness finally realized by the display module, the first display panel, and the second display panel as a whole is close to the desired brightness, thereby achieving an ideal image display.

Through the above display control method, brightness of the display device may be adjusted layer by layer from coarse to fine at levels of the backlight partition, the pixels of the first display panel, and the pixels of the second display panel (the sub-pixel level of the image). Therefore, compared with adjusting the brightness of the display module and/or the second display panel separately, the efficiency of brightness adjustment is improved, the effect of brightness adjustment is improved, the contrast and peak brightness of the image are enhanced, and the adverse effects of halo are reduced.

Figure 7:
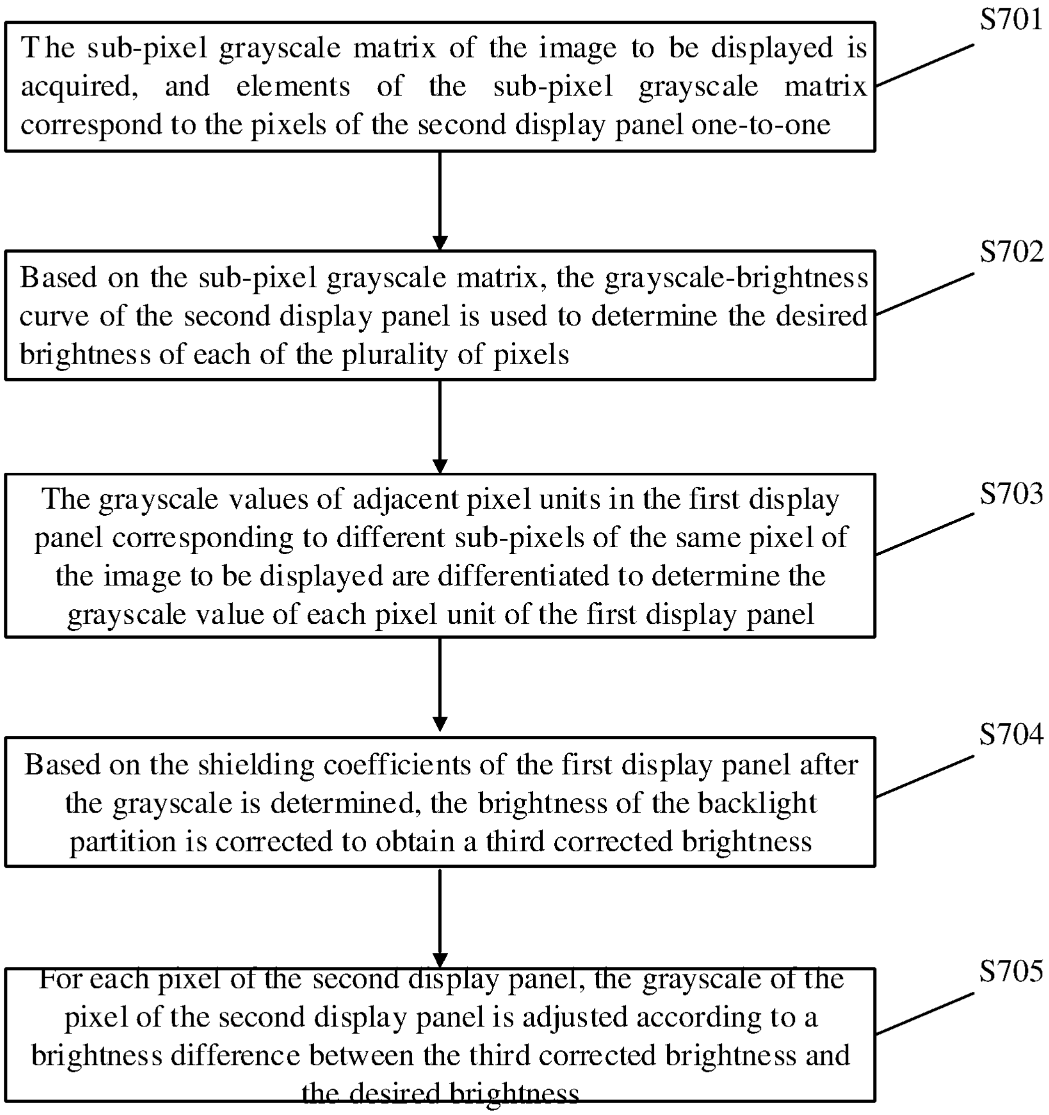
FIG. 7 is a flowchart of another specific embodiment of a display control method according to the present disclosure.

FIG. 7 is a flowchart of another specific embodiment of a display control method according to the present disclosure. As shown in FIG. 7, the present disclosure further provides a display control method, which is applied to a display device, the display device includes a backlight module, a first display panel and a second display panel sequentially arranged on a light-emitting side of the backlight module. The second display panel is configured to display images and the pixels of the second display panel correspond to the color sub-pixels of the image to be displayed one-to-one, and a height of a pixel unit of the first display panel is same as a height of a pixel of the second display panel, a width of the pixel unit of the first display panel is twice a width of the pixel of the second display panel, and at least some rows of pixels in the first display panel are offset by one pixel width relative to the pixels of adjacent rows. The display control method includes following steps S701 to S705.

In step S701, the sub-pixel grayscale matrix of the image to be displayed is acquired, and elements of the sub-pixel grayscale matrix correspond to the pixels of the second display panel one-to-one.

In step S702, based on the sub-pixel grayscale matrix, the grayscale-brightness curve of the second display panel is used to determine the desired brightness of each of the plurality of pixels. The technical meanings and acquisition methods of "grayscale-brightness curve" and "desired brightness distribution graph" have been described in detail in the embodiments of the present disclosure, and may not be repeated here. By causing grayscale values of adjacent pixel units in the first display panel corresponding to different sub-pixels of the same pixel of the image to be displayed (for example, RG sub-pixels and B sub-pixel) to be different, the image color may be enhanced.

In step S703, the grayscale values of adjacent pixel units in the first display panel corresponding to different sub-pixels of the same pixel of the image to be displayed are differentiated to determine the grayscale value of each pixel unit of the first display panel. For example, in a pair of adjacent pixel units of the first display panel, a grayscale of a pixel unit corresponding to B sub-pixel is 50 to 80 lower than a grayscale of a pixel unit corresponding to RG sub-pixels, so that a contrast of the RG colors and the B color is more vivid. In some embodiments, a reference grayscale of each pixel unit may be preset for the first display panel, and a difference value is taken on a basis of the reference grayscale. In some embodiments, the reference grayscale of each corresponding pixel unit of the first display panel may be preset according to a difference between the desired brightness and the brightness of the backlight partition, for example, a difference at each pixel unit of the first display panel.

In step S704, based on the shielding coefficients of the first display panel after the grayscale is determined, the brightness of the backlight partition is corrected to obtain a third corrected brightness.

In step S705, for each pixel of the second display panel, the grayscale of the pixel of the second display panel is adjusted according to a brightness difference between the third corrected brightness and the desired brightness.

In the display control method provided by the embodiments of the present disclosure, while enhancing the color of the image, through fine brightness adjustment at the pixel level of the second display panel, good brightness compensation may be achieved, so that the compensated brightness is close to the desired brightness. The technical meanings and acquisition methods of "shielding coefficient" and "corrected brightness" have been described in detail in the embodiments of the present disclosure, and may not be repeated here.

Figure 8:
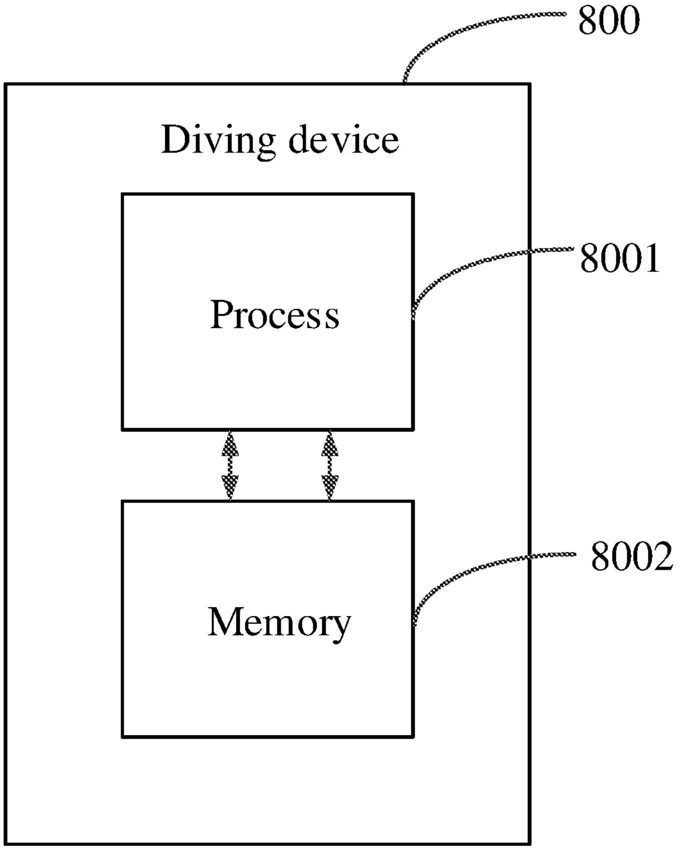
FIG. 8 is a schematic structural diagram of a driving device according to the present disclosure.

FIG. 8 shows a schematic structural diagram of a driving device according to another embodiment of the present disclosure. As shown in FIG. 8, the driving device 800 according to an embodiment of the present disclosure may include: at least one processor 8001; and a memory 8002. The memory 8002 may store instructions. At least one processor 8001 executes instructions stored in the memory 8002 to implement the driving method according to the embodiment of the present disclosure.

Those skilled in the art may understand that by executing the instructions stored in the memory 8002 by the processor 8001, the driving device 800 according to the embodiment of the present disclosure may implement various functions of the exemplary driving method according to the embodiment of the present disclosure, for example, the driving method described above with reference to FIGS. 6 and 7. For brevity, I won't repeat them here.

The above description is intended to be illustrative and not restrictive. For example, the above examples (or one or more of them) may be used in combination with each other. For example, a person of ordinary skill in the art may use other embodiments when reading the above description. In addition, in the above specific embodiments, various features may be grouped together to simplify the present disclosure. This should not be construed as intent that an unclaimed disclosed feature is necessary for any claim. On the contrary, the subject matter of the present disclosure may be less than all the features of a specific disclosed embodiment. Thus, the following claims are incorporated herein as examples or embodiments in the detailed description, where each claim independently serves as a separate embodiment, and it is considered that these embodiments may be combined with each other in various combinations or permutations. The scope of the present disclosure should be determined with reference to the appended claims and the full scope of equivalents entitled by these claims.

The above embodiments are only exemplary embodiments of the present disclosure, and are not used to limit the present disclosure, and the protection scope of the present disclosure is defined by the claims. Those skilled in the art may make various modifications or equivalent substitutions to the present disclosure within the essence and protection scope of the present disclosure, and such modifications or equivalent substitutions should also be regarded as falling within the protection scope of the present disclosure.

What is claimed is:

1. A display device, comprising:

a backlight module comprising a plurality of backlight partitions;

a first display panel and a second display panel sequentially arranged on a light-emitting side of the backlight module, wherein the second display panel is configured to display images, and the first display panel comprises a plurality of pixel areas corresponding to the plurality of backlight partitions, each pixel area comprises a plurality of pixel units, and each pixel unit corresponds to a plurality of pixels of the second display panel; and a processor configured to:

acquire a pixel grayscale matrix of an image to be displayed, wherein a plurality of grayscales of the pixel grayscale matrix correspond to the plurality of pixels of the second display panel one-to-one;

determine desired brightness of each of the plurality of pixels by using a grayscale-brightness curve of the second display panel based on the pixel grayscale matrix;

determine set light-emitting brightness of each backlight partition according to grayscale information in the pixel grayscale matrix corresponding to each backlight partition;

correct the set light-emitting brightness of each backlight partition, based on light diffusion coefficients of the plurality of backlight partitions, to obtain a first corrected brightness of each backlight partition;

determine a grayscale of each pixel unit in a corresponding pixel area according to a difference between the first corrected brightness and the desired brightness of each pixel for the corresponding pixel area;

correct the set light-emitting brightness of each backlight partition, based on the light diffusion coefficients of the plurality of the backlight partitions and shielding coefficients of the first display panel, to obtain a second corrected brightness of each backlight partition; and for each pixel of the second display panel, adjust a grayscale of each pixel of the image to be displayed according to a difference between the second corrected brightness of a corresponding backlight partition and the desired brightness of the pixel, to cause the second display panel to display the image to be displayed in adjusted grayscale.

2. The display device according to claim 1, wherein the processor is further configured to:

reduce a grayscale of each pixel unit in the pixel area in response to the first corrected brightness of the corresponding backlight partition being higher than the desired brightness of the pixels corresponding to the pixel unit.

3. The display device according to claim 1, wherein the processor is further configured to:

reduce a grayscale of each pixel in response to the second corrected brightness of the corresponding backlight partition being higher than the desired brightness of the pixel.

4. The display device according to claim 1, wherein the processor is further configured to:

determine the set light-emitting brightness of each backlight partition according to a statistical distribution of grayscales of the plurality of pixels corresponding to each backlight partition, or a maximum value of the grayscales of the plurality of pixels, in the pixel grayscale matrix.

5. The display device according to claim 1, wherein the processor is further configured to:

for each backlight partition, determine a grayscale of the pixel unit according to a difference between the first corrected brightness and the desired brightness of the pixel for a corresponding pixel unit;

smooth and filter the determined grayscale of the pixel unit;

correct the set light-emitting brightness of each backlight partition, based on the light diffusion coefficients of the plurality of backlight partitions and the shielding coefficients of the first display panel after smoothing and filtering, to obtain a second corrected brightness;

adjust a grayscale of each pixel of the image to be displayed to perform brightness compensation on the image to be displayed, according to a difference between the second corrected brightness of the corresponding backlight partition and the desired brightness of the pixel for the corresponding pixel unit; and perform color correction on the image to be displayed after brightness compensation.

6. The display device according to claim 5, wherein the processor is further configured to:

perform uniformly compensation on operating parameters of each backlight partition.

7. The display device according to claim 5, wherein the processor is further configured to:

perform uniformity compensation on the smoothed and filtered grayscale of the pixel unit.

8. A display device, comprising:

a backlight module;

a first display panel and a second display panel displaying colors sequentially arranged on a light-emitting side of the backlight module, wherein the second display panel is configured to display images and the second display panel comprises a plurality of pixels, the plurality of pixels correspond to color sub-pixels of an image to be displayed one-to-one, the first display panel comprises a plurality of pixel units, and a height of each of the plurality of pixel units is same as a height of the pixel, a width of each of the plurality of pixel units is twice a width of the pixel, and pixel units in at least part of rows of the first display panel are shifted by one pixel width relative to pixel units in adjacent rows of the first display panel; and a processor configured to:

acquire a pixel grayscale matrix of an image to be displayed, wherein elements of the pixel grayscale matrix correspond to the plurality of pixels one-to-one;

determine desired brightness of each of the plurality of pixels based on the pixel grayscale matrix;

determine a grayscale value of each pixel unit to cause grayscale values of adjacent pixel units corresponding to different color sub-pixels of same pixel of the image to be displayed to be different;

correct brightness of each backlight partition based on shielding coefficients of the first display panel after the grayscale is determined, to obtain a third corrected brightness of each backlight partition; and adjust a grayscale of each pixel according to a difference between the third corrected brightness of corresponding backlight partition and the desired brightness of the pixel.

9. The display device according to claim 8, wherein pixel units in even-numbered rows of the first display panel are shifted by one pixel width relative to pixel units in odd-numbered rows of the first display panel.

10. The display device of claim 9, wherein each group of three pixel units adjacent to each other in a "品" shape in the first display panel correspond to different color sub-pixel combinations, respectively.

11. The display device according to claim 8, wherein the processor is further configured to:

smooth and filter the determined grayscale value of the pixel unit;

correct brightness of each backlight partition, based on the shielding coefficients of the first display panel after smoothing and filtering, to obtain a third corrected brightness of each backlight partition;

adjust a grayscale of each pixel according to a difference between the third corrected brightness of the corresponding backlight partition and the desired brightness of the pixel, to compensate brightness of the image to be displayed; and perform color correction on the image after brightness compensation.

12. The display device according to claim 8, wherein each backlight partition comprises a direct-type micro light-emitting diode array, and a size of each backlight partition is an integer multiple of a size of the pixel unit; and wherein the processor is further configured to:

determine set light-emitting brightness of each micro light-emitting diode in each backlight partition according to grayscale information in the pixel grayscale matrix corresponding to each backlight partition;

correct the set light-emitting brightness of each micro light-emitting diode in each backlight partition, based on light diffusion coefficients of micro light-emitting diodes in all backlight partitions, to obtain a first corrected brightness of all backlight partitions; and for each backlight partition, determine a grayscale of each pixel unit in the pixel area according to a brightness difference between the first corrected brightness and the desired brightness of the pixel for the corresponding pixel area.

13. A display control method implemented by the display device according to claim 1, comprising, implemented by the processor:

acquiring a pixel grayscale matrix of an image to be displayed, wherein elements of the pixel grayscale matrix correspond to the plurality of pixels one-to-one;

determining desired brightness of each of the plurality of pixels based on the pixel grayscale matrix;

determining set light-emitting brightness of each backlight partition according to grayscale information in the pixel grayscale matrix corresponding to each backlight partition;

correcting the set light-emitting brightness of each backlight partition, based on light diffusion coefficients of the plurality of backlight partitions, to obtain a first corrected brightness of each backlight partition;

determining a grayscale of each pixel unit in the pixel area according to a difference between the first corrected brightness and the desired brightness of a pixel for corresponding pixel area;

correcting the set brightness of each backlight partition, based on light diffusion coefficients of the plurality of backlight partitions and shielding coefficients of the first display panel, to obtain a second corrected brightness of each backlight partition, wherein the shielding coefficients of the first display panel are determined by using a grayscale of each pixel unit; and adjusting a grayscale of each pixel of the second display panel according to a brightness difference between the second corrected brightness of a corresponding backlight partition and the desired brightness of each pixel of the second display panel.

14. A display control method implemented by the display device according to claim 8, comprising, implemented by the processor:

acquiring a pixel grayscale matrix of an image to be displayed, wherein elements of the pixel grayscale matrix correspond to the plurality of pixels one-to-one;

determining desired brightness of each pixel unit based on the pixel grayscale matrix;

determining a grayscale value of each pixel unit to cause grayscale values of adjacent pixel units corresponding to different color sub-pixels of same pixel of the image to be displayed to be different;

correcting brightness of the backlight partition, based on shielding coefficients of the first display panel after the grayscale is determined, to obtain a third corrected brightness of each backlight partition; and adjusting a grayscale of each pixel according to a difference between the third corrected brightness of corresponding backlight partition and the desired brightness of the pixel.

15. A driving device, comprising:

a memory configured to store instructions; and at least one processor;

wherein the at least one processor executes instructions stored in the memory to implement the method according to claim 13.

16. A non-transitory computer-readable storage medium storing instructions configured to implement the method according to claim 13 when executed by at least one processor.

17. A driving device, comprising:

a memory configured to store instructions; and at least one processor;

wherein the at least one processor executes instructions stored in the memory to implement the method according to claim 14.

18. A non-transitory computer-readable storage medium storing instructions configured to implement the method according to claim 14 when executed by at least one processor.

* * * * *